(12) United States Patent
Maienschein et al.

(10) Patent No.: US 6,742,638 B2
(45) Date of Patent: Jun. 1, 2004

(54) HYDRAULIC TORQUE CONVERTER

(75) Inventors: Stephan Maienschein, Baden-Baden (DE); Bruno Müller, Bühl (DE); Gunnar Back, Bühl (DE)

(73) Assignee: LuK Lamellen und Kupplungsbau Beteiligungs KG, Buhl/Baden (DE)

( * ) Notice: Subject to any disclaimer, the term of this patent is extended or adjusted under 35 U.S.C. 154(b) by 0 days.

(21) Appl. No.: 10/194,085

(22) Filed: Jul. 11, 2002

(65) Prior Publication Data

US 2003/0010588 A1 Jan. 16, 2003

(30) Foreign Application Priority Data

Jul. 11, 2001 (DE) .......................... 101 33 699

(51) Int. Cl.$^7$ ............................... F16H 45/02
(52) U.S. Cl. .................. 192/3.29; 192/70.12; 192/212; 192/113.36
(58) Field of Search ............... 192/3.28, 3.29, 192/3.3, 70.12, 70.14, 107 R, 212, 113.36

(56) References Cited

U.S. PATENT DOCUMENTS

| | | | |
|---|---|---|---|
| 4,986,397 A | * | 1/1991 | Vierk .................. 192/3.3 |
| 5,501,309 A | | 3/1996 | Walth et al. |
| 5,553,694 A | | 9/1996 | Schultz et al. |
| 5,782,327 A | | 7/1998 | Otto et al. |
| 5,921,366 A | * | 7/1999 | Walth et al. ........... 192/113.36 |
| 6,047,806 A | * | 4/2000 | Sasse .................... 192/113.36 |
| 6,497,312 B1 | * | 12/2002 | Sasse et al. ............... 192/3.29 |

FOREIGN PATENT DOCUMENTS

JP          57167559 A  * 10/1982  ........... F16H/45/02

* cited by examiner

*Primary Examiner*—Richard M. Lorence
(74) *Attorney, Agent, or Firm*—Darby & Darby (57) ABSTRACT

Overheating of various parts of a hydraulic torque converter between the engine and the transmission of the power train in a motor vehicle, wherein the torque converter employs a bypass clutch which generates heat when it is operated with slip, is counteracted by establishing one or more paths for the flow of hydraulic converter fluid from a first plenum chamber at one side of the axially movable piston of the bypass clutch to a second plenum chamber. A first portion of each such path is defined by at least one groove in a friction surface of at least one part of the bypass clutch, and a second portion of each such path is defined by one or more throttling orifices which offers or offer to the fluid flow a resistance several times that of the groove(s).

40 Claims, 4 Drawing Sheets

HYDRAULIC TORQUE CONVERTER

CROSS-REFERENCE TO RELATED CASES

This application claims the priority of the commonly owned copending German patent application Serial No. 101 33699.3 filed Jul. 11, 2001. The disclosure of the aforesaid German priority application, as well as that of each US and/or foreign patent and/or patent application identified in the specification of the present application, is incorporated herein by reference.

BACKGROUND OF THE INVENTION

This invention relates to improvements in apparatus which are known as torque converters, and more particularly to improvements in fluid-operated torque converters. Still more particularly, the invention relates to improvements in fluid-operated torque converters which can be utilized with advantage in the power trains of motor vehicles, especially for controlled transmissions of torque between driving and driven parts, e.g., between the rotary output element of a prime mover (such as the camshaft or the crankshaft of an internal combustion engine) and the rotary input shaft of an automatic change-speed transmission.

An apparatus of the above outlined character normally comprises a rotary housing which is non-rotatably connected to the output element of the prime mover, a pump which is driven by and can constitute an integral part of the housing, a turbine which can be driven by the pump through the medium of a body of fluid in the housing and can transmit torque to the input shaft of the transmission, an optional stator which (if utilized) is installed in the housing between the vanes of the pump and the turbine, and a bypass clutch or lockup clutch (hereinafter called bypass clutch) which can be engaged to bypass the pump, e.g., to transmit torque directly between the housing and the turbine or the input shaft of the transmission. Such torque converters often employ at least one additional constituent which is installed between an input part and an output part and serves as a torsional vibration damper, e.g., between a (first) hub of the turbine and a (second) hub affixed to the input shaft of the transmission. In addition to performing the above-enumerated tasks, the torque converter can further serve as a starter clutch between the engine and the automatic transmission in the power train of the motor vehicle.

The bypass clutch of the torque converter is arranged to become effective during certain stages of operation of a motor vehicle, and more specifically of the torque converter, for example, when there is no need for torque conversion and/or when it is desired to avoid or reduce energy losses due to pronounced slippage between the pump and the turbine. As already mentioned above, engagement of the bypass clutch entails direct transmission of torque between the housing and the output element(s) of the torque converter, e.g., from the housing (or from a part sharing all angular movements of the housing) to a hub or another part which shares the angular movements of the input shaft of the change-speed transmission. Otherwise stated, the transmission of torque (in the at least partially engaged condition of the bypass clutch) is effected as a result of frictional engagement between one or more parts rotating with the housing and one or more parts non-rotatably connected with the input shaft of the transmission.

The just discussed frictional engagement invariably or frequently entails the generation of heat, for example, in the region(s) where the friction linings of a disc often forming part of the bypass clutch engage the adjacent friction surface or surfaces, e.g., a friction surface on the housing of the torque converter and a friction surface on the piston of the bypass clutch. The generation of heat is attributable to slippage between the friction linings and the respective friction surfaces, a slippage which is often desirable for the sake of comfort to the occupant(s) of the motor vehicle and develops when the condition of the bypass clutch is caused to change from that of full disengagement to that of complete engagement or vice versa.

In accordance with presently known proposals, heating or overheating of the bypass clutch is sought to be prevented (or its intensity reduced) by establishing a pressure differential between the contents of two plenum chambers which flank the axially movable piston of the bypass clutch and contain bodies of a suitable converter fluid (e.g., oil). One of the chambers is adjacent the turbine and the other chamber is adjacent a wall of the housing of the torque converter. The friction linings on the disc of the bypass clutch are provided with grooves which permit the fluid to flow between the two chambers when the fluid pressure in one of the chambers exceeds the pressure of fluid in the other chamber. The circulating fluid cools the parts which, in the absence of heat withdrawal, are likely or bound to be overheated.

When the pressure differential between the contents of the two chambers assumes a certain value, the cooling action of the aforedescribed conventional cooling systems for the parts of the bypass clutch (i.e., the rate of fluid flow between the chambers by way of the grooves in the friction linings of the clutch disc) depends upon several parameters, primarily upon the dimensions and/or configurations of the grooves and the wear upon the parts which are provided with and/or are adjacent to the grooves. In order to compensate for wear, the rate of fluid flow in the grooves of friction linings of the clutch disc in the bypass clutch of a conventional torque converter is selected in such a way that the intensity of cooling action in a new torque converter exceeds the requirements; this is to ensure that the cooling action is still acceptable when the wear upon the friction linings reaches or approximates the maximum permissible wear.

OBJECTS OF THE INVENTION

An object of the present invention is to provide a novel and improved fluid-operated apparatus which can be utilized as a torque converter and is constructed and assembled in such a way that the rate of fluid flow between the plenum chambers, and hence the cooling action upon its parts, is at least substantially constant during its entire useful life.

Another object of this invention is to provide a torque converter wherein the extent of wear upon the friction linings in the bypass clutch cannot influence, or cannot unduly influence, the rate of fluid flow between the chambers.

A further object of the invention is to provide a torque converter wherein the cooling of the friction surfaces provided on certain constituents of the bypass clutch remains satisfactory even when the wear upon such surfaces approximates or reaches the maximum permissible value.

An additional object of the instant invention is to provide a fluid-operated torque converter wherein the rate of fluid flow between the chambers when the torque converter is new need not exceed a value which approaches or matches an optimum value for the reasons of economy and/or of saving energy.

Still another object of this invention is to provide a novel and improved bypass clutch or lockup clutch for use in a fluid-operated torque converter.

A further object of the invention is to provide a bypass clutch wherein the heat transfer between the friction linings and the converter fluid (e.g., oil) is superior to that in presently known bypass clutches.

Another object of the invention is to provide a novel and improved friction lining for use in the bypass clutches of torque converters, especially torque converters which can be put to use in the power trains of motor vehicles.

An additional object of the invention is to provide a novel and improved method of enhancing or optimizing the exchange of heat between the fluid and the bypass clutch in the housing of a hydraulic torque converter.

Still another object of the invention is to provide a novel and improved method of controlling the flow of hydraulic fluid between the chambers in the housing of a fluid-operated torque converter.

A further object of the present invention is to provide a hydrodynamic torque converter with novel and improved means for mounting the output member of a torsional vibration damper in the converter housing on the input shaft of a change-speed transmission, particularly an automatic transmission, in the power train of a motor vehicle.

Another object of the instant invention is to provide a novel and improved modular fluid-operated torque converter.

SUMMARY OF THE INVENTION

One feature of the present invention resides in the provision of a fluid-operated apparatus (such as a hydrodynamic torque converter) for transmitting torque from a rotary output element of a driven unit (for example, from the crankshaft or camshaft of an internal combustion engine in the power train of a motor vehicle) to a coaxial input element of a driven unit (e.g., the input shaft of a change-speed transmission in the aforementioned power train). The improved apparatus comprises a hollow rotary fluid containing housing which is coaxial with and is connected to the output element of the prime mover, a pump which is connected with and is located in the housing, a turbine which is rotatable with the input element and is located in and can rotate relative to the housing, and a bypass or lockup clutch which is disposed in the housing and is engageable (entirely or in part) to connect the housing with the input element of the driven unit. The clutch includes a piston which is movable axially in and divides the interior of the housing into a plurality of chambers in the engaged condition of the clutch. A first chamber of such plurality of chambers has a fluid-admitting inlet and a second chamber has a fluid-discharging outlet. The piston is movable axially of the housing to engage the bypass clutch (either entirely or in part) in response to an increase of fluid pressure in the first chamber above the fluid pressure in the second chamber. The improved apparatus further comprises means for establishing a path for the flow of fluid between the first and second chambers (with attendant exchange of heat between the fluid and the adjacent parts) in the engaged condition of the clutch. Such path establishing means (hereinafter also called heat exchanger or heat exchanger unit) has a first friction surface which is borne by the housing and a second friction surface which is adjacent the first friction surface at least in the (partly or fully) engaged condition of the clutch and is rotatable with the input element. At least one of the friction surfaces has a continuous or composite groove which communicates with the first and second chambers, which defines a first portion of the aforementioned path and which is arranged to offer a pronounced resistance to the flow of a fluid (e.g., oil) therethrough. The path establishing means is further provided with at least one throttling orifice which defines a second portion of the path between the first and second chambers.

In accordance with a desirable feature of the invention, the at least one throttling orifice is arranged to offer to the flow of fluid therethrough a resistance which exceeds the pronounced resistance of the groove. The pronounced resistance of the groove can be between at least 2 and 10 percent of the combined resistance of the at least one groove and the at least one throttling orifice.

The at least one throttling orifice can be provided in a metallic part of the bypass clutch; such metallic part can include or constitute a portion of the housing, a friction disc of the bypass clutch or a portion of the piston of the bypass clutch.

The bypass clutch can further include a carrier (such as a friction disc) and at least one friction lining on the carrier. The at least one friction surface can be provided on the friction lining. In lieu of being provided on a friction disc, the at least one friction surface can be provided on a portion (e.g., a radially extending wall) of the housing, or on a portion of the piston of the bypass clutch. The at least one throttling orifice of the just discussed embodiment of the novel and improved path establishing means can be provided in the carrier of the bypass clutch.

The groove can constitute a circumferentially complete channel and the at least one friction surface can be provided with at least one opening which connects the groove with one of the chambers and offers a relatively small (such as negligible) resistance to the flow of fluid therethrough.

The improved apparatus can further include at least one torsional vibration damper which can be interposed in a power train between the housing and the input element of the driven unit.

The apparatus can further comprise a stator which is interposed between the pump and the turbine.

The groove of the path establishing means can include at least one section extending at least substantially circumferentially of the piston and having a first portion which communicates with the at least one throttling orifice and at least one second portion. Such path establishing means can be further provided with at least one opening which communicates with the at least one second portion of the at least one section as well as with one of the chambers and offers a negligible resistance to the flow of fluid therethrough.

The at least one friction surface can constitute an annular surface rotatable about an axis which coincides with the axis of the housing and having a portion remotest from such axis. The at least one throttling orifice can be provided in such remotest portion of the annular surface.

The at least one friction surface can be provided with a fluid intake adjacent the at least one throttling orifice; such intake can be defined or established by a stamped out portion of the path establishing means. The latter can include a friction lining and its at least one friction surface can be provided on such friction lining. The intake of the at least one friction surface can be constituted by a stamped-out portion of the friction lining. The latter can be further provided with the at least one throttling orifice and can further have a stamped-out passage which communicates with the at least one throttling orifice and preferably offers to the fluid flow a resistance constituting a small fraction of the resistance offered by the throttling orifice.

The path establishing means can comprise an annular component (such as a washer) and at least one friction lining which is borne by the annular component and is provided with the at least one friction surface. The at least one throttling orifice of such path establishing means can be provided, at least in part, in the annular component and the latter can have at least one first locating or positioning means which is in register with a second locating or positioning means in or on the at least one friction lining. Such positioning means facilitate rapid and accurate assembly of the annular component and the friction lining. At least one of the positioning means can include or constitute a notch in the annular component or in the friction lining.

In accordance with a further modification, the path establishing means comprises an annular metallic component and at least one friction lining which is borne by the annular metallic component and is provided with the at least one friction surface. The groove can include a first channel which is provided in the at least one friction surface and a second channel which communicates with the first channel by way of the at least one throttling orifices, at least in the at least partly engaged condition of the bypass clutch. The first channel can constitute a circumferentially complete substantially annular channel (e.g., a channel composed of a zig-zag shaped array of straight channel sections). Alternatively, at least the first channel can include a plurality of discrete sections (e.g., an array of substantially V-shaped sections).

The at least one surface of the path establishing means can constitute an annular surface and such path establishing means can be provided with a plurality of throttling orifices which are spaced apart from each other as seen in the circumferential direction of the annular surface.

It is also possible to provide the path establishing means with a plurality of throttling orifices which are disposed at different distances from the axis of the housing.

If the path establishing means includes an annular carrier, the latter can be installed between the aforementioned radial wall of the housing and the piston of the bypass clutch. Such path establishing means can further include first and second friction linings which are provided on the carrier (preferably in such a way that the carrier is disposed between them). The first and second friction linings respectively confront the wall of the housing and the piston of the bypass clutch, and the at least one friction surface can include first and second portions which are respectively provided on the first and second friction linings. The other friction surface has a first portion which is provided on the wall of the housing and confronts the first friction lining, and a second portion which is provided on the piston and confronts the second friction lining.

The groove of the just discussed path establishing means can include first and second portions which are respectively provided in the first and second portions of the at least one friction surface. The at least one orifice communicates with the first and second portions of the groove. If the path establishing means is provided with a plurality of first and second throttling orifices, the first orifices communicate with the first portion and the second orifices communicate with the second portion of the groove. The first orifices can alternate with the second orifices as seen in the circumferential direction of the annular carrier. A third portion of the path defined by the just discussed path establishing means can extend between the first and second throttling orifices; such third portion of the path can be defined by at least one portion of the groove.

In a further embodiment of the improved apparatus, the path establishing means includes an annular friction lining which is borne by the piston of the bypass clutch and engages the radial wall of the housing in the fully or partly engaged condition of the bypass clutch. The groove and the at least one throttling orifice are provided in the friction lining, and such path establishing means can further have at least one opening which connects the at least one throttling orifice with one of the plenum chambers. The at least one opening can be provided in one of the radially innermost and radially outermost surfaces of the friction lining or in the piston of the bypass clutch or in both. The arrangement is preferably such that the at least one opening and the at least one throttling orifice offer a major first resistance and the groove offers a minor second resistance to the flow of fluid between the plenum chambers.

It will be seen that the novel path establishing means is or can be integrated into the bypass clutch or vice versa.

If the path establishing means includes at least one friction lining, the latter can be disposed intermediate the piston of the bypass clutch and the aforementioned preferably or substantially radial wall of the housing. The piston is disposed between the wall and the turbine.

As already mentioned hereinbefore, the driven-unit the input element of which can receive torque by way of the pump or by way of the bypass clutch can constitute a change-speed transmission, preferably an automatic transmission.

A set of leaf springs can be provided to axially movably couple the piston of the bypass clutch with the housing.

Another important feature of the present invention resides in the provision of a hydrodynamic torque converter which can be utilized between the rotary output element of a prime mover and a rotary input element which is coaxial with the output element and forms part of a change-speed transmission, particularly in the power train of a motor vehicle. The improved torque converter comprises a rotary fluid containing housing which is coaxial with and is connectable the output element of the prime mover, a pump which is disposed in and is rotatable with the housing, a turbine which is disposed in the housing and is rotatable by fluid in the housing in response to rotation of the pump, and an engageable and disengageable bypass clutch which is disposed in the housing and is operable to at least temporarily connect the housing with the input element of the transmission. The bypass clutch includes a piston which is movable axially of the housing and divides the interior of the housing into at least two fluid-containing chambers in the at least partially engaged condition of the bypass clutch. A first chamber of the plurality of chambers has a fluid-admitting inlet, and a second chamber of the plurality of chambers has a fluid-discharging outlet. The clutch is engageable in response to admission of fluid into the first chamber at a pressure exceeding the fluid pressure in the second chamber with attendant axial movement of the piston in the housing. The clutch has a first friction surface which is rotatable with the housing, and a second friction surface which is rotatable with the input element and bears upon first surface in partly or fully engaged condition of the clutch.

The torque converter further comprises a torsional vibration damper which is disposed in the housing and includes an input member rotatable with the housing about the common axis of the housing and input element, at least in the at least partially engaged condition of the bypass clutch, an output member which is turnable about the aforementioned axis relative to the input member, and means (such as one or more coil springs) for yielding opposing rotation of the output member relative to the input member. Still further the torque converter comprises means for non-rotatably mounting the output member of the torsional vibration damper on the input element (such as a shaft) of the transmission; the mounting means includes a first hub which is rotatable with the turbine, a second hub which is adjacent and coaxial with the first hub and is axially movably carried by the input element of the transmission, a set of mating gears which couple the second hub for rotation with the output member of the torsional vibration damper and energy storing means (e.g., one or more diaphragm springs) for yieldably biasing the hubs against each other axially of the housing.

The torsional vibration damper can further comprise a second set of mating gears which couple the input member for rotation with the first hub. At least one of the two sets of mating gears can include gears having limited freedom of angular movement relative to each other.

The novel features which are considered as characteristic of the invention are set forth in particular in the appended claims. The improved torque converter itself, however, both as to its construction and the modes of constructing, assembling and operating the same, together with numerous additional important and advantageous features and attributes thereof, will be best understood upon perusal of the following detailed description of certain presently preferred specific embodiments with reference to the accompanying drawing.

DESCRIPTION OF PREFERRED EMBODIMENTS

Figure 1:
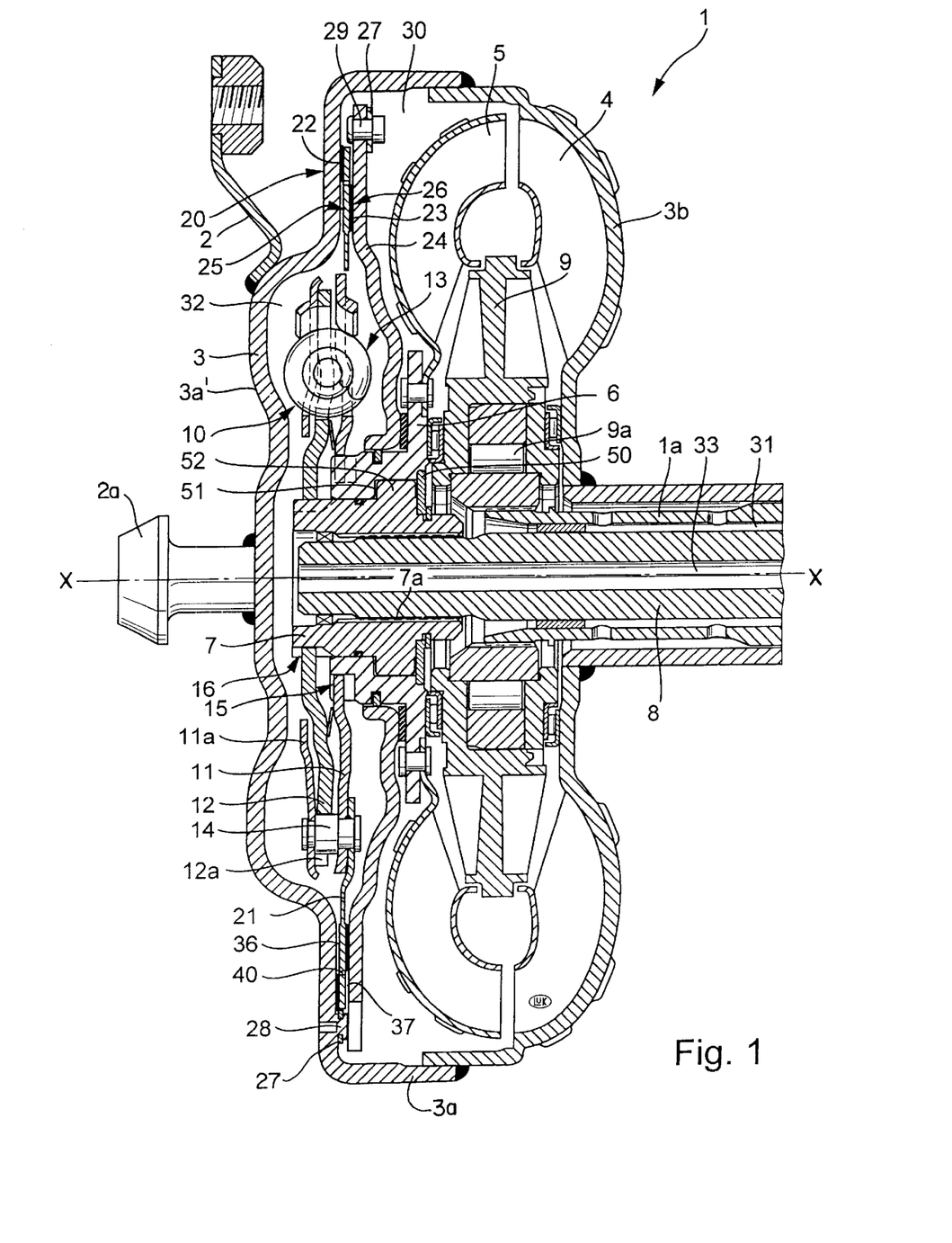
FIG. 1 is an axial sectional view of a fluid-operated apparatus which constitutes a hydrodynamic torque converter and employs a torsional vibration damper between a hub of the turbine and a hub on the input shaft of the transmission in the power train of a motor vehicle and utilizes a bypass clutch in combination with fluid path establishing means embodying a first form of the present invention.

FIG. 1 shows certain constituents of a hydrokinetic torque converter 1 which operates between a rotary output element 2 of a prime mover (not shown) and a rotary in put shaft 8 of an automatic change-speed transmission (not shown). The common axis of the output element 2, the input shaft 8 and the torque converter 1 (hereinafter frequently called converter for short) is shown at X—X. The prime mover can constitute the internal combustion engine in the power train of a motor vehicle and includes an output shaft 2a (e.g., a crankshaft or a camshaft) which transmits torque to the output element 2. The latter can constitute a so-called flexplate which is welded and/or otherwise affixed to a radially extending wall 3a' of a section 3a forming a first part of the housing 3 of the torque converter 1. The section 3a is sealingly secured (e.g., welded) to a second section 3b of the housing 3, and the second section carries or is of one piece with the vanes of a pump 4 provided in the housing adjacent a turbine 5.

When the output element 2 is to drive the input shaft 8 by way of the housing 3, pump 4 and turbine 5, the latter is rotated by the body of hydraulic fluid (also called converter fluid) which is confined in the housing. The turbine 5 is non-rotatably connected with a first hub 6 which is rotatably mounted on a second hub 7; the latter is non-rotatably mounted on the shaft 8 of the change-speed transmission by a set of mating gears 7a including an internal gear in the hub 7 and a spur gear or another suitable external gear on the shaft 8. An optional stator 9 is mounted in the housing 3 between the pump 4 and the turbine 5 on a freewheel 9a which is borne by an axial extension 1a of the case or housing of the change-speed transmission including the input shaft 8.

The input member 11 of a torsional vibration damper 10 is non-rotatably coupled to the hub 6 of the turbine 5, and the damper 10 further comprises an output member 12 which is non-rotatably mounted on the hub 7 of the input shaft 8. The disc-shaped input and output members 11, 12 have limited freedom of angular movement relative to each other under the bias or against the opposition of one or more resilient energy storing elements 13. FIG. 1 shows a composite energy storing element 13 having two coil springs which are received in registering windows provided in the members 11 and 12; one of these coil springs is fitted into the other coil spring.

As a rule, the torsional vibration damper 10 comprises two or more pairs of coil springs 13 which are spaced apart from each other as seen in a circumferential direction of the coaxial input and output members 11 and 12. The illustrated damper 10 further comprises a third disc-shaped member 11a which is secured to the input member 11 by an annular array of rivets 14. A first pair of mating internal and external gears 15 non-rotatably couples the input member 11 and the third member 11a of the damper 10 to the hub 6 of the turbine 5, and a second set of mating gears 16 serves to non-rotatably mount the output member 12 on the hub 7. At least one of the mating pairs of gears 15 and 16 can include a pair of gears which have a limited freedom of angular movement relative to each other; this is often desirable in order to ensure that the parts of the damper 10 cooperate with a certain angular play when the shaft 2a is rotated at the idling speed of the combustion engine or another prime mover in the power train of a motor vehicle.

In order to interrupt or reduce the transmission of torque from the output element 2 to the input shaft 8 via housing 3, pump 4 and turbine 5, the bypass clutch or lockup clutch 20 of the converter 1 can be engaged (with or without slip) to transmit torque from the housing 3 to the hub 7. The illustrated bypass clutch is a so-called friction disc clutch in that it employs a metallic friction disc 21 which is disposed between the radially outer portion of the wall 3a' and an axially movable piston 24 of the clutch 20. The disc 21 constitutes a carrier for and is disposed between two annular washer-like friction linings 22, 23. The friction lining 22 can be caused to bear upon the adjacent friction surface 25 of the wall 3a', and the friction lining 23 can be caused to engage the adjacent friction surface 26 of the axially movable piston 24 when the clutch 20 is at least partially engaged in that the piston 24 is moved axially toward the carrier 21 and the wall 3a'. The piston 24 is movable axially of and can also turn relative to the hub 6 of the turbine 5 and is in sealing engagement with the hub 6.

Several leaf springs 27 are utilized to non-rotatably but axially movably secure the piston 24 to the housing 3 radially outwardly of the friction linings 22 and 23. The leaf springs 27 are affixed to the wall 3a' by rivets 28 and to the piston 24 by rivets 29. These leaf springs preferably further serve as a means for accurately centering the piston 24 relative to the housing 3.

The piston 24 is movable axially of the housing 3 and turbine 5 by bodies of hydraulic fluid in plenum chambers 30, 32 which are disposed in the housing at opposite sides of the piston. The chamber 30 can receive pressurized fluid from a suitable source by way of an inlet 31 between the axial extension 1a of the transmission case and the peripheral surface of the input shaft 8, and the chamber 32 can discharge fluid by way of an outlet 33 which, in the embodiment of FIG. 1, is an axial passage (e.g., a bore) in the input shaft 8. The source of fluid for admission into the chamber 30 via inlet 31 can include a suitable pump (not shown) which is free to supply pressurized fluid into the chamber 30 when the clutch 20 is to be engaged, either with or without slip.

The hydraulic fluid can flow from the chamber 30 into the chamber 32 along the friction linings 22, 23. The chamber 32 accommodates the torsional vibration damper 10, and its contents can be evacuated into a suitable receptacle or reservoir (not shown) by way of the outlet 33.

When the bypass clutch 20 is being engaged or disengaged, as well as when it is operated with slip, the friction surfaces 25, 26, the carrier 21 and its friction linings 22, 23 rotate at different speeds. This generates friction heat which necessitates a cooling of certain constituents of the converter 1, primarily for the purpose of preventing an overheating of the friction linings 22, 23, of the friction surfaces 25, 26, of the converter fluid and of certain other parts. This is accomplished by imparting to the carrier 21 and to the friction linings 22, 23 certain special profiles many of which will be described in greater detail with reference to FIGS. 2 to 10, particularly FIGS. 2, 4 and 6. Thus, the friction linings 23, 22 are respectively provided with specially configurated, distributed and oriented channels or grooves 36, 37 through which the converter fluid is forced to flow when the clutch 20 is partly or fully engaged to thus achieve a highly satisfactory cooling of the friction surfaces 25, 26 as well as of the friction linings. The configurations and distributions of the grooves 37 and 36 in the friction linings 22, 23 are such that one ensures an optional relationship between the achievable cooling action and the (remaining) over all areas of those channeled or grooved surfaces of the friction linings which come into frictional engagement with the respective neighboring friction surfaces 26, 25. The grooves 36 and 37 can be impressed into the friction surfaces of the two friction linings and extend into such friction surfaces in the direction of the axis X—X when the carrier 21 is properly installed in the bypass clutch 20 and the latter is properly installed in the housing 3.

The friction linings 22, 23 are subject to wear as a result of repeated engagement and disengagement as well as slippage of the bypass clutch 20; this invariably entails changes of shapes (such as the depths) of the grooves 36, 37 and/or of other parameters of the friction linings 22, 23 as well as of the parts which come into repeated longer- or shorter-lasting frictional engagement with the friction linings. This, in turn, entails corresponding changes in the rate of flow of converter fluid between the plenum chambers 30, 32 and hence in the rate at which heat is being withdrawn from certain parts of the converter 1. The rate of fluid flow between the two chambers is determined primarily by the differential between the pressures of fluid bodies in the chambers 30 and 32. Thus, if the pressure differential remains unchanged the rate of fluid flow between the chambers 30, 32 decreases in response to progressing wear upon the parts which are in frictional engagement with and are permitted or caused to slip relative to each other, such as during engagement or disengagement of the bypass clutch 20 as well as during continuous operation with slip. This will be readily appreciated by bearing in mind that the depth of a recess or groove in a surface which is in frictional engagement with and (at least at times) slides relative to an adjacent surface is bound to decrease during the useful life of a bypass clutch. Furthermore, the rate of flow of a hydraulic fluid (such as oil) through the grooves 36, 37 is a function of the viscosity of such fluid, i.e., of a parameter which varies in response to temperature changes. In other words, the rate of fluid flow through the grooves 36, 37 is higher when the temperature of the torque converter 1 is higher.

In order to enhance the reproducibility of the rate of flow of converter fluid and to improve the design of the torque converter 1 during the entire useful life or at least during a major part of the lives of the friction linings 22 and 23, there is provided at least one throttling orifice 40 which is designed to act as a diaphragm so that its functioning is not dependent upon any changes and that it confines or restricts the fluid flow to a range which is acceptable or tolerable during the useful life of the bypass clutch 20 or an equivalent clutch. The entire resistance of converter fluid to the flow between the plenum chambers 30 and 32 depends upon (a) the parameter(s) of the throttling orifice(s) 40 and (b) from the grooves 36, 37. FIGS. 2 to 10 illustrate several presently preferred embodiments of the improved torque converter 1 and/or of the grooves in the friction linings of its bypass clutch. However, it will be appreciated that the drawing merely shows certain presently preferred embodiments and that the invention encompasses numerous additional embodiments which are specifically pointed out in this specification and in the appended claims, as well as embodiments which will be comprehended by those skilled in the relevant fields of endeavor even though they are neither shown nor described in detail but are within the scope of the invention or inventions covered by the language of the claims. The orifice(s) and the groove(s) receiving converter fluid from such orifice(s) to guide the fluid from the chamber containing a body of fluid which is maintained at a first pressure into a chamber wherein the pressure of fluid is lower ensure satisfactory operation of the converter and of its bypass clutch at least when the converter is embodied in the power train of a motor vehicle, such as a power train employing an automatic or automated transmission. The term "automatic" is intended to encompass automatic and automated.

The components $R_B$ and $R_D$ of the improved orifice-groove arrangement generate the entire fluid pressure drop between the two plenum chambers. The deflection effects of the converter fluid and additional (secondary) effects, which can also generate a (relatively low) resistance to the flow of converter fluid can be disregarded without adversely affecting the accuracy of the improved method of and arrangement for influencing the temperature(s) of certain constituents of the improved torque converter.

When the bypass clutch 20 is engaged, either entirely or in part (i.e., with or without slip between the friction disc or carrier 21 on the one hand and the wall 3a' of section 3a of the housing 3 on the other hand), torque is being transmitted from the housing 3 to the input shaft 8 of the change-speed transmission by way of the bypass clutch 20 in that the carrier 21 transmits torque to the input member 11 of the torsional vibration damper 10. The rivets 14 connect the input member 11 to the disc-shaped third member 11a of the damper 10 radially inwardly of the friction linings 22, 23 and simultaneously connect the input member 11 with the carrier 21.

The rivets 14 can further serve as a means for limiting the extent of angular movability of the input and output members 11, 12 of the damper 10 relative to each other. To this end, the output member 12 is provided with one or more at least substantially radially outwardly extending arms 12a. Alternatively, the limiting action of the members 11, 12 against excessive angular movement relative to each other can be achieved in that at least one energy storing element 13 of the damper 10 can be compressed or extended only to a predetermined extent and such maximum compression or expansion of the element 13 (e.g., a coil spring) takes place at the exact stage of preselected maximum angular displacement of the input and output members 11, 12 relative to each other.

The input member 11 transmits torque to the output member 12 of the damper 10 by way of the energy storing element(s) 13, and the member 12 transmits torque to the hub 7 which, in turn, rotates the input shaft 8 of the change-speed transmission by way of the pair of mating gears 7a. The mating gears 16 serve to transmit torque between the hub 7 and the output member 12 of the torsional vibration damper 10.

In order to avoid twisting, other distorting and/or other forms of deformation between the parts 11, 11a, 12 and/or 13 during assembly of the torsional vibration damper 10, especially during engagement or disengagement of the bypass clutch 20, the gears 15 enable the input member 11 to move axially of the hub 6 and/or the gears 16 enable the output member 12 to move axially of the hub 7. Furthermore, the torque converter 1 comprises at least one energy storing device 50 (e.g., a leaf spring or a diaphragm spring) which tends to move at least one radially outwardly projecting extension of the hub 7 axially against a complementary shoulder or an analogous part 51 of the hub 6, i.e., the hub 6 can move (within limits) axially of the hub 7 in a direction to the right, as viewed in FIG. 1, against the opposition of the energy storing device 50. The stop 51 can but need not be an integral part of the hub 6.

The torsional vibration damper 10 is effective when the input shaft 8 receives torque by way of the bypass clutch 20 as well as when the shaft 8 receives torque by way of the pump 4 and turbine 5. It is also possible to omit the gears 15 between the output member 22 of the damper 10 and the hub 6; this prevents the transmission of torque between the turbine 5 and the input member 11 of the damper 10 by way of the hub 6. In such embodiment of the improved torque converter, the transmission of torque between the turbine 5 and the input member 11 of the damper 10 takes place by way of an additional pair of mating gears 52 which operate between the hubs 6 and 7. The gears 52 are not needed if the converter 1 employs the gears 15, and vice versa.

The various gears and pairs of gears can be made during making of the respective constituents of the improved torque converter. Furthermore, the gears 52 can be designed to operate with a certain amount of play already during utilization of the damper 10, and the extent of such play can exceed the working or operating range of the damper 10 so that the gears 52 can simultaneously serve as a means for limiting the extent of operability of the damper.

It is often advisable to employ in the improved torque converter component parts of modular design. The hubs 6, 7 and/or the torsional vibration damper 10 can constitute modules which can be utilized with or independently of each other. For example, the torsional vibration damper 10 can be designed to be useful in combination with the hubs 6, 7 or with a single hub (e.g., with the hub 7).

An important advantage of the improved torque converter is that the streams of converter fluid which flow between the chambers 30 and 32 in the at least partially engaged condition of the bypass clutch 20 ensure a predictable cooling of at least one friction surface, i.e., of the friction surface 26 of the piston 24 and the adjacent surface of the friction lining 23 as well as of the friction surface 25 and the adjacent surface of the friction lining 22. The exact extent of the cooling action is not dependent solely upon the configurations (i.e., conditions) of the aforementioned friction surfaces but primarily upon the resistance which the throttling orifice(s) 40 offers or offer to the flow of fluid between the grooves 36 and 37, i.e., between the plenum chambers 30 and 32. In other words, the extent of wear upon the friction surfaces of the parts 3a', 22, 23 and 24 can influence the cooling of these parts and of the preferably at least partly metallic carrier 21 only to a certain extent; however, the major part of the cooling action is determined by the throttling orifice(s) 40 which can remain unchanged during the entire useful life of the bypass clutch 20 and/or the entire torque converter 1.

In many instances, the friction linings are likely to undergo pronounced wear so that the rate of fluid flow through their grooves or channels (and hence the cooling action of the fluid flowing therein) is likely to undergo pronounced changes. This does not unduly affect the cooling action of the fluid which flows between the plenum chambers 30 and 32 because the rate of fluid flow is not dependent primarily upon the condition of (extent of wear upon) the friction linings 22 and 23 but rather upon the number and dimensions of the throttling orifice(s) 40.

Another advantage of the improved flow path establishing means in the converter 1 is that the pressure of fluid being supplied to the plenum chamber 30 via inlet 31 in order to at least partially engage the bypass clutch 20 can remain at least substantially constant. This is attributable to the fact that by far the major part of cooling action of the fluid flowing from the inlet 31 into the chamber 30, from the chamber 30 through the groove 36, throttling orifice(s) 40 and groove 37, and thence into the plenum chamber 32 (to be discharged via outlet 33) is dependent upon the throttling action of the orifice(s) rather than on the condition of the friction linings 22 and 23 (i.e., on the throttling action of the groove 37 and/or 36). The configuration of the groove 36 and/or 37 and/or the conditions of such grooves (e.g., the wear upon the respective friction linings 23, 22) can influence the cooling action upon the parts 3, 22, 21, 23, 24 to a certain extent; however, the primary influence upon the cooling action of the fluid flowing along the path(s) defined by the novel path establishing unit (which is integrated into the bypass clutch 20) is that exerted by the throttling orifice(s) 40. Such influence need not change during the useful life of the bypass clutch 20. Consequently, the grooves 36, 37 can be configured and dimensioned in such a way that they can ensure an even more accurate selection of the actual flow resisting (and hence cooling) action of the path establishing unit or means; however, the primary flow restricting (and hence cooling) action is furnished by the throttling orifice(s) 40.

For example, the grooves 36, 37 can determine between about 2 and 10 percent of the cooling action and the remaining percentage can be controlled by the throttling orifice(s) 40. Similar conditions can prevail in all embodiments of the improved torque converter. The throttling action of the orifice(s) 40 can be influenced by the selection of its or their length(s), cross-sectional area(s) and number (s); the throttling action of grooves 36, 37 depends upon their lengths, widths, depths, locations and shapes (zig-zag shapes, meandering shapes and/or analogous formations have been found to be highly satisfactory in many embodiments of the improved torque converter).

The aforediscussed parameters are not the sole prerequisites for a predictable and satisfactory or optimal rate of fluid flow between the chambers 30 and 32. Thus, the flow of converter fluid is also influenced by deflection of fluid at the locations of inflow of fluid into a groove from one of the chambers and at the locations of issuance of fluid from a groove into the other chamber, additional flow restrictors (if any) in the groove or grooves, the finish, of the surface(s) bounding the groove(s) and/or others. As a rule, the influence of such additional parameters upon the flow of fluid between the chambers 30 and 32 is of little importance so that these parameters can be disregarded if the individual or joint influence(s) is or are small in comparison with that of the groove(s) 36 and/or 37.

The grooves 36, 37 can be impressed or coined into the friction linings 23, 22 (this is actually shown in FIG. 1) and/or they may be impressed, coined or otherwise provided in the friction surfaces of other parts such as the (normally or preferably metallic) wall 3a', the (normally or preferably metallic) carrier 21, the (normally or preferably metallic) piston 24 and/or other constituents of the bypass clutch, the housing, the turbine and/or other parts which can be said to constitute the components of the improved path establishing unit or means. Such components can include additional parts, e.g., annular members which are provided with grooves and/or with throttling orifices prior to being non-rotatably affixed to the housing to the piston, to the carrier, to at least one of the hubs, to the turbine and/or to other constituents of the improved converter.

The friction linings 22, 23 can be secured to the respective (opposite) sides of their preferably metallic carrier 21 by resorting to a suitable adhesive. Alternatively, the friction linings can be affixed to their support(s) by resorting to rivets and/or other mechanical and/or chemical fastener means. It is often preferred to provide the grooves 36, 37 in the friction linings 22 and 23. However, it is equally possible to provide the grooves or channels in other constituents of the novel path establishing unit in addition to or in lieu of the grooves in the friction linings. For example, one or more grooves can be provided in the friction surface 25 and/or 26 and the throttling orifice(s) in or are then provided in the parts 22, 21 and 23 to ensure the flow of fluid between and in the grooves of the friction surfaces 25 and 26.

If the groove(s) is or are provided in at least one of the friction linings or in a single friction lining, they can be impressed or coined at an elevated pressure simultaneously with another impressing operation, e.g., simultaneously with the securing of the friction linings to their carrier or carriers, such as the carrier 21, the wall 3a' and/or the piston 24. This mode of forming the groove or grooves simultaneously with attachment of the grooved part(s) to its or their carrier(s) contributes significantly to the accuracy and reproducibility of the formation of grooves, of proper positioning of the grooves relative to the supports or carriers for the grooved parts and to the positions of the grooves relative to the corresponding throttling orifice(s).

A satisfactory friction lining (such as 22 and/or 23) can have a thickness of about 1 mm. It has been found that the depth(s) of groove(s) 36 and 37 in such friction lining(s) is or are optimal if it is or if they are in the range of not more than about 0.6 mm. The width(s) of such groove(s) can be in the range of between about 3 and 5 mm, and its or their length(s) can be in the range of between about 100 and 200 mm. The resistance offered by the path establishing unit which is provided with such grooves to the flow of fluid between the two plenum chambers can be in the range of about 4 bar, i.e., the resistance can approximate or match that in a satisfactory conventional torque converter while the conventional torque converter is in an optimum condition.

As already mentioned hereinbefore, the resistance to fluid flow offered by the throttling orifice(s) 40 can be between 90 and 98 percent of the overall resistance offered by the path establishing unit of the improved torque converter or an equivalent thereof. Thus, if the combined resistance offered by the groove(s) and the throttling orifice(s) is such that the pressure drop is about 4 bar, the pressure drop of between 3 and 3.5 bar is normally attributable to the provision of the throttling orifice(s). If the share of the throttling orifice(s) 40 in the establishment of an acceptable pressure drop is to be even higher, one can resort to shorter grooves; however, this expedient cannot be resorted to beyond a certain upper limit because an excessive shortening of the grooves entails a reduction of the cooling action due to reduced area of heat exchanging contact between the groove(s) and the part(s) in which the groove(s) is or are provided as well as between the open side(s) of the groove(s) and the overlying friction surface(s).

Each throttling orifice (such as the orifice 40 shown in FIG. 1) can communicate with a single groove (such as 22 or 23) and with one of the plenum chambers (30 and 32). Alternatively, each throttling orifice can communicate with two (i.e., it can connect two) grooves as actually shown in FIG. 1, i.e., on its way from the chamber 30 into the chamber 32 the fluid must flow through a portion of or through the entire groove 37, through the orifice(s) 40 and thereupon through a portion of or through the entire groove 36. It is preferred to provide each throttling orifice in a metallic part or in a metallic portion of a part (such as the carrier 21 shown in FIG. 1). However, and as will be described hereinafter with reference to the embodiments shown in FIGS. 2 to 10, it is also within the purview of the present invention to provide one or more additional throttling orifices in the wall 3a' in such a way that the fluid leaving the groove 36 of the friction lining 22 must pass through the additional throttling orifice(s) on its way from the groove 22 into the chamber 32. Alternatively, one or more additional throttling orifices can be provided in the friction lining 22 to establish a passage for the flow of fluid from the groove 36 into the chamber 32.

In accordance with a further embodiment, the orifice(s) in the carrier 21 can be replaced with one or more relatively large openings which offer little or practically no resistance to the flow of fluid from the groove 37 into the groove 36, and the wall 3a' is then provided with one or more throttling orifices which are functional equivalents of the orifice(s) 40 and constitute the only means for permitting the fluid to flow from the groove 36 into the chamber 32. If the carrier 21 is provided with a plurality of throttling orifices 40, they are or they can be equidistant from each other (as seen in the circumferential direction of the annular washer-like carrier). This will be described in greater detail with reference to FIGS. 2 and 3. The same preferably applies for plural throttling orifices which, if employed, replace or are provided in addition to the orifice(s) 40 to connect the groove 22 with the chamber 32 and are machined or otherwise formed in the wall 3a'.

Figure 2:
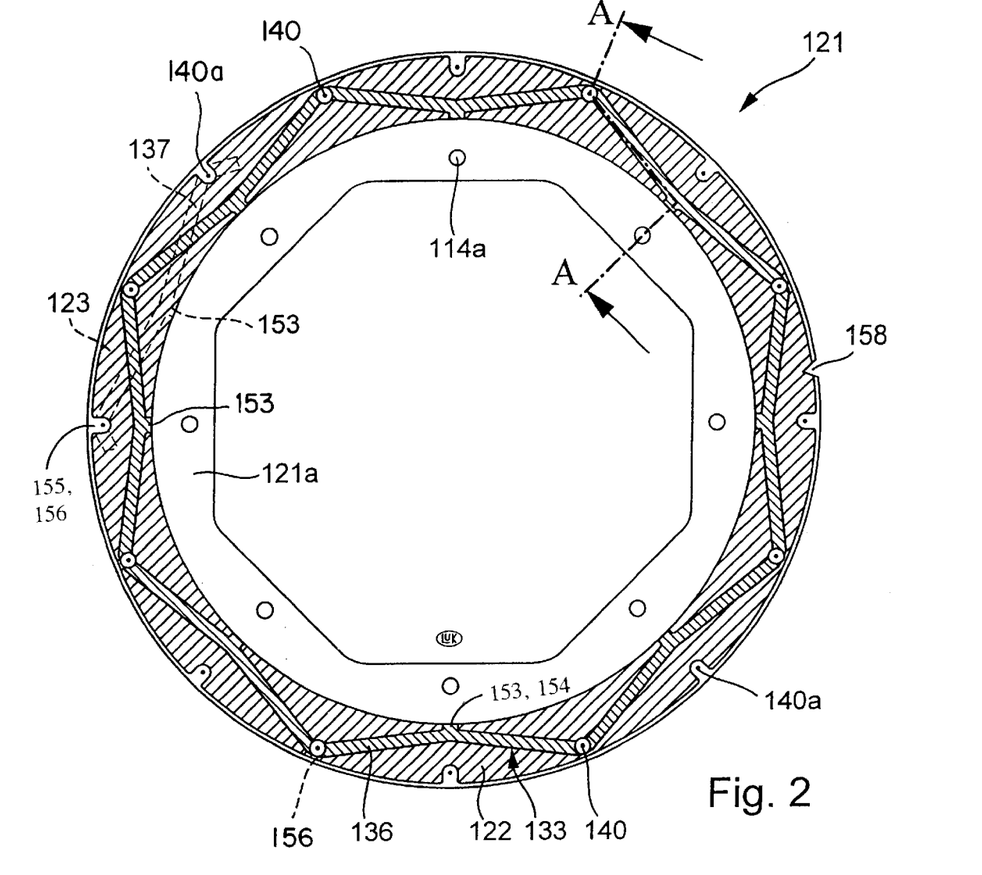
FIG. 2 is an elevational view of a friction disc which carries a pair of friction linings and forms part of a combined bypass clutch and fluid flow establishing means constituting a modification of those shown in FIG. 1.

Good results were obtained with a path establishing unit wherein, in contrast to that shown in FIG. 1, a single throttling orifice or an array of circumferentially spaced-apart orifices connects the chamber 30 with the groove 37 (which is or which can be a circumferentially complete groove corresponding to the groove 136 shown in FIG. 2), at least one relatively large opening or passage in the carrier 21 (with a negligible throttling effect) connects the groove 36 with the groove 37, and one or more throttling orifices in the wall 3a' constitute the only means to permit fluid to flow from the groove 36 into the chamber 32. The groove 36 and/or 37 can be a complete circular channel, a zig-zag shaped channel (as shown at 136 in FIG. 2) or an undulate (meandering) channel with smooth arcuate transitions between successive straight or substantially straight sections.

Still further the groove 37 can communicate with a groove which is provided in the friction surface 26 and receives fluid from the chamber 30 through one or more non-restricting or slightly restricting openings in the piston 24, the groove 37 can communicate with the groove 36 through one or more throttling orifices 40 each of which extends through the parts 23, 21, 22, the groove 36 can communicate with a groove in the friction surface 25, and the groove in the surface 25 can communicate with the chamber 32 through one or more relatively large openings in the wall 3a'. Though more complex than that shown in FIG. 1, the just described modification of the improved path establishing unit ensures a highly satisfactory cooling of the piston 24, friction linings 22, 23, carrier 21 and wall 3a'.

Each of the grooves 36, 37 can constitute a circumferentially complete channel, or each such groove can consist of two or more sections and each section of one of the grooves can communicate with a single section of the other groove. The primary flow restricting action can take place at the locus or at the loci of fluid outflow from the chamber 30 into the groove 23, at the point or points of fluid flow from the groove 23 into the groove 22, or at the location(s) of fluid flow from the groove 22 into the chamber 32.

If the grooves are not circumferentially complete channels, one end of one such channel can receive fluid from the chamber 30, the other end of the one channel can communicate with one end of the other channel by way of one or more throttling orifices, and the other end of the other channel can communicate with the chamber 32 by way of one or more openings which offer negligible or low resistance to the flow of fluid therethrough.

Still further, at least one of the grooves 36, 37 (such as 37) can be replaced with a groove one end of which receives fluid from the chamber 30 with little or no resistance to the flow, and intermediate portion of which constitutes a throttling orifice, and the other end of which communicates with one end of the other groove (36) with minimal resistance to flow. The other end of the other groove communicates with the chamber 32 by way of one or more openings which need not exhibit a pronounced resistance to the flow of fluid therethrough.

If the grooves are zig-zag shaped or undulate channels (see the grooves 136, 137 in FIG. 2), one thereof can receive fluid from the chamber 30 at its radially innermost points, and such one groove can communicate with the other groove at its radially outermost points. The fluid in the other groove cools the respective part(s) of the path establishing unit on its way into the chamber 32.

It is normally advisable to introduce the fluid (from the chamber 30) into the path establishing unit of FIG. 1 (i.e., into the groove 37 of the friction lining 23) in such a way that the fluid encounters little or no resistance to the flow. The same applies for that portion of the path which extends from the chamber 30 to the throttling orifice(s) 40. The manner in which this can be accomplished will be described with reference to FIGS. 2 and 3.

Torque converters which are similar to that shown in FIG. 1—but without the improved path establishing means—are disclosed in commonly owned U.S. Pat. No. 5,501,309 (granted Mar. 26, 1996 to Walth et al. for "HYDROKINETIC TORQUE CONVERTER WITH LOCKUP CLUTCH") and in commonly owned U.S. Pat. No. 5,782,327 (granted Jul. 21, 1998 to Otto et al. for "HYDROKINETIC TORQUE CONVERTER AND LOCKUP CLUTCH THEREFOR"). A combination of a torque converter (which is devoid of the novel path establishing unit) with an automatic change-speed transmission is disclosed in U.S. Pat. No. 5,553,694 (granted Sep. 10, 1996 to Schulz et al. for "MULTIPLE RATIO AUTOMATIC TRANSMISSION AND TORQUE CONVERTER").

Figure 3:
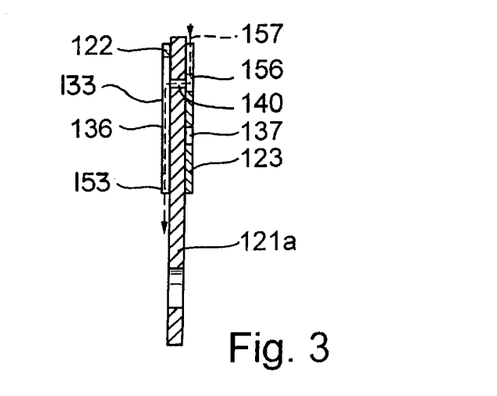
FIG. 3 is a fragmentary sectional view as seen in the direction of arrows from the line A—A in FIG. 2.

FIGS. 2 and 3 illustrate a disc-shaped carrier 121 which can be utilized in the torque converter of FIG. 1 in lieu of the carrier 21. The carrier 121 has an annular washer-like component 121a connectable with the output element of a hydrokinetic torque converter which employs a carrier e.g., in lieu of the carrier 21 shown in FIG. 1. For example, the carrier 121 can constitute the input member of the torsional vibration damper. Alternatively, the carrier 121 can be directly and non-rotatably connected with the output hub (e.g., a part corresponding to the hub 7 shown in FIG. 1) of the torque converter which employs the structure of FIGS. 2 and 3.

The component 121a of the disc-shaped carrier 121 is provided with two washer-like friction linings 122, 123 (see particularly FIG. 3) having profiled exposed friction surfaces. The profiling of the friction surface 133 of the friction lining 122 is shown in FIG. 2; the profiling of the exposed surface of the friction lining 123 is or can be identical with that of the exposed surface 133 of the friction lining 122. The surface 133 is provided with a circumferentially complete zig-zag shaped substantially annular groove or channel 136. A portion of the groove or channel 137 in the exposed surface of the friction lining 123 is shown in FIG. 2 by broken lines and in FIG. 3 by solid lines. It will be seen that the grooves 136, 137 are offset relative to each other as seen in the circumferential direction of the friction linings 122 and 123.

The radially innermost portions of the grooves 136, 137 are respectively provided with openings 153, 154 through which the converter fluid can flow from that chamber (30 or 32) wherein the pressure of fluid is higher toward the other chamber; such flow takes place while the bypass clutch (20) is fully engaged or operates with slip. The inflow of fluid into the grooves 136, 137 takes place by way of throttling orifices 140, 140a which are spaced apart from each other in the circumferential direction of the friction disc or carrier 121. The orifices 140 alternate with the orifices 140a, again as seen in the circumferential direction of the carrier 121. These throttling orifices are provided in part in the component 121a and in part in the friction linings 122, 123 at the radially outermost portions of the respective zig-zag shaped grooves 136, 137.

The inflow of hydraulic fluid from the plenum chamber in which the fluid pressure is higher into the groove 136 or 137 takes place via preferably circular throttling orifices 140 or 140a, and through the stamped-out inlets, 155, 156 which are respectively provided in the radially outermost portions of the friction linings 122, 123. For example, the inflow of pressurized fluid from the chamber (30 or 32) wherein the pressure is higher takes place via a stamped-out inlet 155 of the friction lining 122 to flow into the respective throttling orifice 140 while the fluid flows from the stamped-out inlets 156 of the friction lining 123 into the throttling orifices 140a and thence into the groove 136.

The diameters of the throttling orifices 140 and 140a (see the orifice 140 which is shown in FIG. 3) are much smaller than the widths of the grooves 136, 137 in the regions of the radially outermost portions of the respective grooves (i.e., at the radially outermost portions of the friction linings); this is of advantage because the flow of fluid into and from the grooves 136, 137 is not affected by eventual departures of the angular position of the friction lining 122 and/or 123 (relative to the component 121a) from an optimum or ideal position shown in FIG. 2.

In order to facilitate proper or acceptable angular positioning of the friction linings 122, 123 relative to the component 121a, at least one of these parts is provided with an indicium 158 which ensures an optimal angular orientation of the parts 121a, 122 and/or 121a, 123 and/or 122, 123, and/or 121a, 122, 123 relative to each other. The illustrated indicium 158 is a set of three notches which are provided in the marginal portions of the parts 121a, 122 and 123; when such notches are in accurate register with each other, the friction linings 122, 123 assume optimal angular positions relative to each other as well as relative to the component 121a. The illustrated positioning means 158 in the form of notches can be replaced with or utilized jointly with means in the form of labels, stickers or analogous parts which are provided on the friction lining 122 and/or 123 as well as on the component 121a.

The reference character 114a denotes in FIG. 2 one of the holes provided in the component 121a and serving to receive portions of fasteners (e.g., the shanks of rivets) which are utilized to secure the friction disc or carrier 121, to another part of the torque converter which utilizes the structure of FIGS. 2 and 3. For example, the rivets 14 in the torque converter 1 of FIG. 1 can be utilized to secure the carrier 121 to the output member 12 of the torsional vibration damper 10 in lieu of the carrier 21.

The component 121a and the friction linings 122, 123 form part of the unit which establishes paths for the flow of converter fluid from the lower pressure chamber, through the inlets 155 or 156, through the grooves 136, 137, through the throttling orifices 140 or 140a, and through the openings 153, 154. The throttling orifices 140, 140a perform by far the major part of the fluid flow throttling action.

The width of an inlet or passage 155 or 156 can be between five and ten times the diameter of a throttling orifice 140 or 140a; this ensures that the throttling orifices can receive or discharge fluid even if the friction linings 123 are not in optimum angular positions relative to the component 121a of the carrier 121. Furthermore, the passages or inlets 155, 156 cannot affect the flow of fluid into and through the throttling orifices 140 and 140a. The dimensions of the preferably stamped-out passages 155, 156 are selected in such a way that they do not unduly affect the stability of the respective friction linings 122 and 123.

The positioning notches 158 can be utilized in addition to or in lieu of other means (such as labels or the like) for facilitating the positioning of the friction linings 122, 123 relative to the component 121a of the carrier 121. All of these notches can simultaneously receive the working end of a suitable single locating tool when the friction linings 122, 123 are properly oriented relative to the component 121a. Proper orientation of the parts 121a, 122, 123 relative to each other is desirable and advantageous because this reduces the likelihood of obstruction of the small-diameter throttling orifices 140 and 140a, e.g., by the friction linings and/or by remnants of the substance (such as an adhesive) which is utilized to bond the friction linings 122, 123 to the component 121a.

If the carrier 121 is utilized in the torque converter 1 of FIG. 1, the grooved friction surface of one of the friction linings 122, 123 confronts the friction surface 25 of the wall 3a' and the grooved friction surface of the other of these friction linings confronts the friction surface of the piston 24.

FIG. 3 shows portions of the component 121a and of the two friction linings 122, 123. The arrow 157 indicates the direction of flow of converter fluid from one of the plenum chambers (not shown in FIG. 3) into the other plenum chamber. Such fluid enters the groove 137 of the friction lining 123 at the stamped-out inlet 156 and flows through the throttling orifices 140 to enter the groove 136 of the friction lining 122 where it flows to the opening or openings 153 of this friction lining and thence into the chamber wherein the fluid pressure is lower. The groove 37 of the friction lining 123 communicates with the chamber containing higher pressure fluid at one or more points which are angularly offset relative to the opening(s) in the friction lining 122.

The carrier 121 embodying the structure of FIGS. 2 and 3 ensures a highly satisfactory cooling of the friction linings 122, 123 of the component 121a and of the surfaces of parts which are adjacent the grooved surfaces of the friction linings 122, 123.

Figures 4, 5:
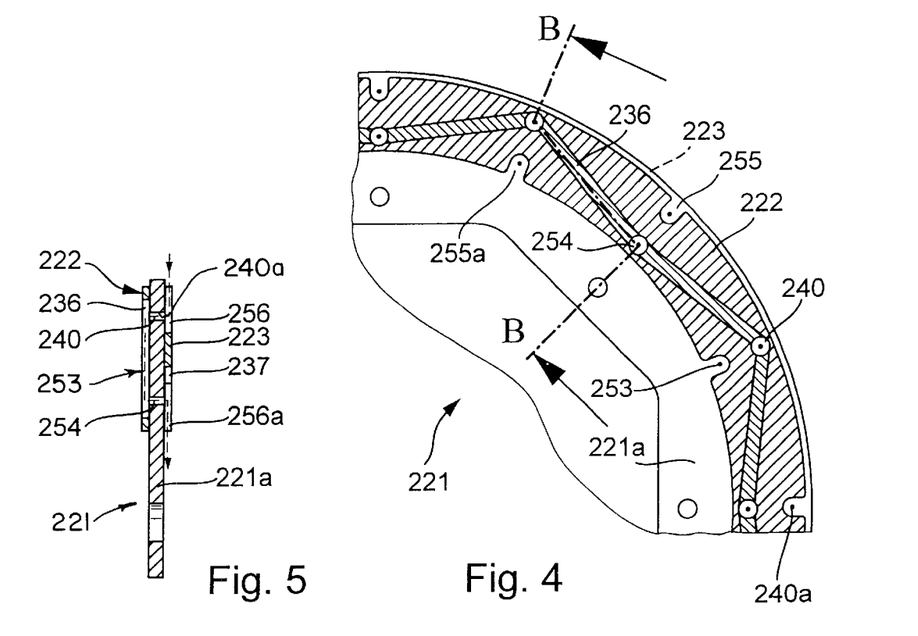
FIG. 4 is a fragmentary elevational view of a combination of a friction clutch and fluid flow establishing means which constitutes a first modification of that shown in FIGS. 2 and 3.
FIG. 5 is a fragmentary sectional view substantially as seen in the direction of arrows from the line B—B in FIG. 4.

FIGS. 4 and 5 illustrate a portion of a friction disc or carrier 221 which constitutes a modification of the friction disc or carrier 121 of FIGS. 2 and 3. The arrangement of openings notches and/or throttling orifices in the annular component 221a and in the friction linings 222, 223 of the carrier 221 is different from that described with reference to the carrier 121 of FIG. 2. In other words, the manner in which the parts 221a, 222, 223 (and the adjoining parts) are cooled when the exposed surfaces of the friction linings 222, 223 are in frictional engagement with the surfaces of adjacent parts in the torque converter embodying the structure of FIGS. 4 and 5 is different from that in the torque converter employing the carrier 121.

The exposed surface of the friction lining 222, has a circumferentially complete zig-zag shaped groove 236. The throttling orifices 154 in the component 121 of FIGS. 2 and 3 are replaced with throttling orifices 254 which are provided at the radially innermost portions of the zig-zag shaped circumferentially complete groove 236. The converter fluid can flow (from the plenum chamber containing a body of fluid at a pressure exceeding that prevailing in the other plenum chamber) into the throttling orifice(s) (such as 240) of the component 221a, thence into the zig-zag shaped groove (236) of the respective friction lining (222) and thence into the plenum chamber wherein the fluid pressure is lower. The dimensions of the throttling orifices 254 can greatly exceed those of the throttling orifices 240 so that a pronounced drop of fluid pressure takes place at the orifices 240 and the fluid dwells in the groove 236 for an accurately selectable interval of time. The pressure drop of fluid which flows from the plenum chamber wherein the pressure is higher into the other plenum chamber is determined by the sum of several parameters, namely the sum of individual resistances offered to the fluid flow through the throttling orifices 240, 254 of the component 221a and the groove 236. The same applies for the resistances which are offered to the flow of fluid through the throttling orifices and openings 240, 253 and the groove 237 of the friction lining 223. The latter is provided with the stamped-out cutouts 255, 255a.

FIG. 5 shows that the friction linings 222, 223 are affixed (e.g., glued) to the respective sides of the component 221a opposite each other. The friction lining 223 has inlets 256 (which can be made by stamping) serving to convey the fluid from the higher-pressure plenum chamber into the throttling orifice(s) 240. The fluid is forced to flow through the orifice(s) 240 and into the groove 236 of the friction lining 222. At the radially innermost portions of the groove 236, the fluid is caused to flow through the throttling orifice(s) 254 of the component 221a, and issues through the preferably stamped out outlet(s) 256a of the friction lining 223 to flow into the chamber wherein the fluid pressure is lower during a particular stage of operation of the torque converter employing the carrier 221 of FIGS. 4 and 5.

The flow of fluid in the groove 237 of the friction lining 223 is analogous to the just described flow through the groove 236 of the friction lining 222. The throttling orifices 240a, 253 (see FIG. 4) are angularly offset relative to the throttling orifices 240, 254 of the friction lining 222, as seen in the circumferential direction of the component 221a. The same applies for the groove 237 of the friction lining 223.

As a rule, and as considered in the direction of fluid flow from the (first) plenum chamber wherein the fluid pressure is higher into the (second) plenum chamber, the throttling orifice(s) is or are nearer to the first chamber and at least one groove follows the throttling orifice(s). The first chamber can be nearer to the pump or to the housing wall depending upon the direction of fluid flow.

Though the throttling orifices are preferably or frequently provided in metallic parts and act as diaphragms the throttling action of which is not influenced, or not appreciably influenced by the temperature-dependent changes of viscosity of the converter fluid, it is also possible to provide the throttling orifices in parts which are made of suitable plastic material, in parts which contain carbon filaments, in ceramic parts and/or others. If the path establishing unit has two or more throttling orifices, the distribution of the orifices is preferably such that the cooling action of the fluid flowing between the two chambers is at least substantially uniform as seen in the circumferential direction of the friction lining(s). Furthermore, the distribution of the throttling orifices is preferably such that adequate cooling of the parts which are heated as a result of frictional engagement between constituents that contact and simultaneously slide relative to each other is achieved by utilizing relatively small quantities of converter fluid. Though a single throttling orifice having a relatively small cross-sectional area can suffice, at least in certain types of torque converters, it is normally advisable to employ two or more suitably distributed throttling orifices having smaller cross-sectional areas than that of a single throttling orifice. The manipulation of a path establishing unit having several throttling orifices is more complicated than that of a unit having a single throttling orifice. The same applies for the making of a path establishing unit with a substantial number of throttling orifices. It is much more convenient to make a unit having a single throttling orifice than to make a unit having a substantial number of such orifices. Moreover, it is more likely that one or more of a substantial number of throttling orifices having very small cross-sectional areas will be clogged by impurities (contained in the flowing converter fluid) than a single throttling orifice having a relatively large cross-sectional area.

It has been ascertained that if the pressure of converter fluid is less than 10 bar, particularly below 5 bar, the diameters d of the throttling orifices are or can be between about 1 mm and 0.5 mm. The number of such throttling orifices is or can be between about 10 and about 20. This can result in a flow of between one and two liters per bar. The throttling orifices of the improved path establishing unit can be made in a stamping, drilling laser beams utilizing or other suitable machine.

In a further presently preferred embodiments of this invention the path establishing unit is provided with at least one groove which determines the drop of fluid pressure and extends from the peripheral zone or from the radially innermost zone to an intermediate zone substantially or approximately midway between the peripheral and radially innermost zones and is disposed between the carrier of friction lining(s) and the friction lining(s). To this end, a suitable channel or groove can be provided in a friction lining or in a carrier of friction linings, e.g., by stamping, milling, erosion or by resorting to another suitable channeling or grooving under taking. The groove or channel communicates with a groove in the friction surface of the friction lining by way of one or more openings which need not perform any throttling function. Such arrangement also guarantees the establishment of a pressure drop which is at least substantially unaffected by wear and prevails between the two plenum chambers. It is of particular advantage to employ prefabricated friction linings, namely friction linings having prefabricated grooves or channels, so that the part which carries one or more friction linings of such character need not be subjected to any further mechanical treatment.

Figure 6:
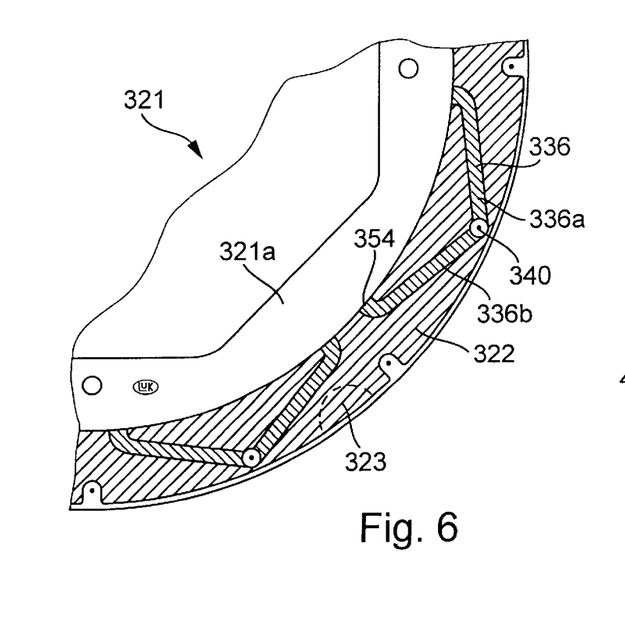
FIG. 6 is a view similar to that of FIG. 4 but showing a portion of a friction disc which constitutes a modification of that shown in FIGS. 2–3 and 4–5.

FIG. 6 shows a portion of a friction disc or carrier 321 which constitutes a modification of the friction discs 21, 121 and 221 respectively shown in FIG. 1, in FIGS. 2–3 and in FIGS. 4–5. Each side of the annular component 321a of the friction disc 321 carries a friction lining 322, 323; of these, only the friction lining 322 is shown in FIG. 6 in greater detail. The groove in the exposed surface of the friction lining 322 is a composite (circumferentially incomplete) groove including several (for example, eight) preferably equidistant substantially V-shaped section 336 each having an apex at the periphery of the component 321a and two legs 336a, 336b with free ends (outlets) 354 adjacent to the radially innermost portion of the friction lining 322.

The throttling orifices 340 are provided at the apices of the V-shaped sections 336 of the composite groove in the exposed surface of the friction lining 322, i.e., at the junction of the legs 336a, 336b of each section 336. The configuration of the composite groove in the other friction lining 323 on the friction disc or carrier 321 can be the same as that of the composite groove including the sections 336 except that the sections of the groove in the exposed surface of the friction lining 323 are angularly offset relative to the sections 336. The angular offset of the sections of the groove in the friction lining 323 relative to the sections 336 of the composite groove in the exposed surface of the friction lining 322 can be similar or analogous to that of, for example, the grooves 136, 137 shown in FIG. 2.

Friction linings of the type shown in FIGS. 1 to 6 can be utilized with advantage in bypass clutches of torque converters wherein a friction lining is provided on an axially movable piston (corresponding to the piston 24 in the torque converter 1 of FIG. 1) to cooperate with a friction surface provided on a wall corresponding to the wall 3a' of the housing 3 shown in FIG. 1. It is also possible to provide the single friction lining on the wall 3a' so that such friction lining can cooperate with a friction surface of the piston 24 in a torque converter which does not employ the carrier 21 of FIG. 1 or an equivalent thereof. The throttling orifice(s) for a single friction lining provided on the piston 24 is or are then provided in the body of the piston.

Thus, if the friction lining having a circumferentially complete or composite groove is provided on the wall 3a' and its exposed surface can be engaged by the friction surface 26 of the axially movable piston 24 (with the friction disc or carrier 21 omitted), the throttling orifice(s) is or are provided in the piston. The orifice(s) of the piston then supplies or supply converter fluid to the groove of the friction lining on the wall 3a' when the modified bypass clutch (i.e., a clutch without the friction disc 21) is at least partially engaged.

Figure 7:
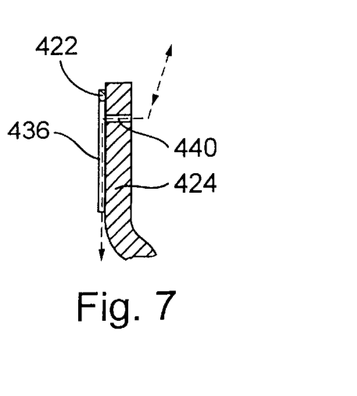
FIG. 7 is a fragmentary sectional view of a piston and a friction lining which can be put to use in a bypass clutch not employing a clutch disc of the type shown in FIG. 1, FIGS. 2–3 and FIGS. 5–6.

FIG. 7 shows a portion of a piston 424 forming part of a bypass clutch in a torque converter and carrying a friction lining 422 engageable with the friction surface on a housing (such as the wall 3a' of the housing 3 shown in FIG. 1). Thus, the structure which embodies the piston 424 operates without a carrier (such as the friction disc 21 shown in FIG. 1). The piston 424 has a plurality of throttling orifices 440 (preferably a circular or substantially circular array of such orifices adjacent its peripheral surface) which serve to admit fluid from the higher pressure plenum chamber (not shown) into the lower pressure chamber (not shown) by way of the groove 436 (e.g., a circumferentially complete groove) of the friction lining 422.

Figure 8:
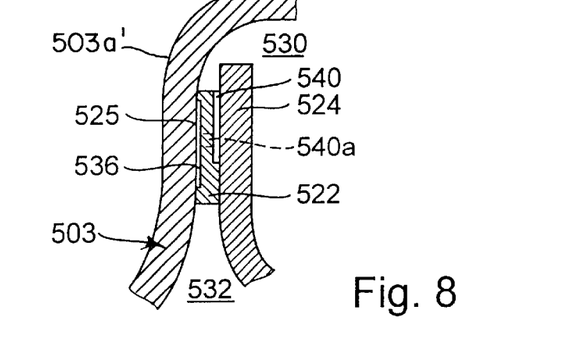
FIG. 8 is a fragmentary axial sectional view of a bypass clutch employing a friction lining which constitutes a modification of that shown in FIG. 7.

Referring to FIG. 8, there is shown a portion of a further fluid-operated torque converter wherein a friction lining 522 borne by the piston 524 of the bypass clutch can frictionally engage the profiled friction surface 525 on the wall 503a' of the housing 503 of the torque converter. The torque converter embodying the structure of FIG. 8 is also capable of regulating the rate of fluid flow from the higher-pressure chamber into the lower-pressure chamber without any, or without any appreciable, influence by the extent of wear upon the friction lining 522.

The arrangement of FIG. 8 operates without a throttling orifice i.e., without an opening or diaphragm in the body of the piston 524. Instead, the throttling orifice(s) is or are provided in the friction lining 522. As shown in FIG. 8, the bypass clutch embodying the piston 524 can operate without a friction disc (corresponding, for example, to the friction disc or carrier 21 shown in FIG. 1), and this embodiment of the improved fluid-operated torque converter can operate with a single friction lining (522). This friction lining is adjacent the profiled friction surface (inner side) of the wall 503a'. The piston 524 is movable axially of the housing 503 toward and away from the profiled friction surface 525 of the wall 503a' and, when the bypass clutch is at least partially engaged (i.e., when the friction lining 522 contacts the profiled surface 525), the parts 522, 524 seal the plenum chambers 530, 532 from each other to an extent which is determined by the design of the friction lining 522 and the profiling of the surface 525.

The surface 525 of the wall 503a' has a groove or channel 536 which communicates with the plenum chamber 532 (this is assumed to be the chamber containing a hydraulic fluid at a pressure less than that of the body of fluid in the other chamber (530). The groove 536 and the chamber 532 can communicate with each other by way of a throttling orifice 540 which determines the difference between the pressures of fluid bodies in the chambers 530, 532. The throttling orifice 540 can communicate with the groove 536 by way of an opening 540a in the friction lining 522.

The entire pressure differential between the fluid bodies in the chambers 530, 532 is determined by the combined resistance which is offered to the flow of fluid between such chambers by the opening 540a throttling orifice 540 and groove 536 in the wall 503a'.

The opening 540a can be stamped directly into the friction lining 522; however, it is also possible to provide this opening in the body of the piston 524. Since the surface surrounding the throttling orifice 540 is not in frictional engagement with the friction surface 525 of the wall 503a', it is not subject to wear (upon the friction lining 522) so that the flow of converter fluid between the chambers 530, 532 (via throttling orifice 540) is not affected by wear upon this friction lining during any stage of useful life of the friction lining. Thus, once the desired or optimum rate of fluid flow between the chambers 530, 532 is selected, such rate remains unchanged as long as the condition of the friction lining 522 is acceptable, i.e., as log as such condition is unduly altered by influences other than the wear upon the grooved side of the friction lining.

It is desirable to ensure that the drop of fluid pressure at the throttling orifice 540 be more pronounced than that in the groove 536 and/or at the opening 540a of the friction lining 522. The exact configuration of the groove 536 is not critical, i.e., this groove can be a circumferentially complete groove (e.g., a zig-zag shaped groove similar to the grooves 136, 137 shown in FIG. 2 or a composite groove such as including sections 336 of the type shown in FIG. 6).

Figure 9:
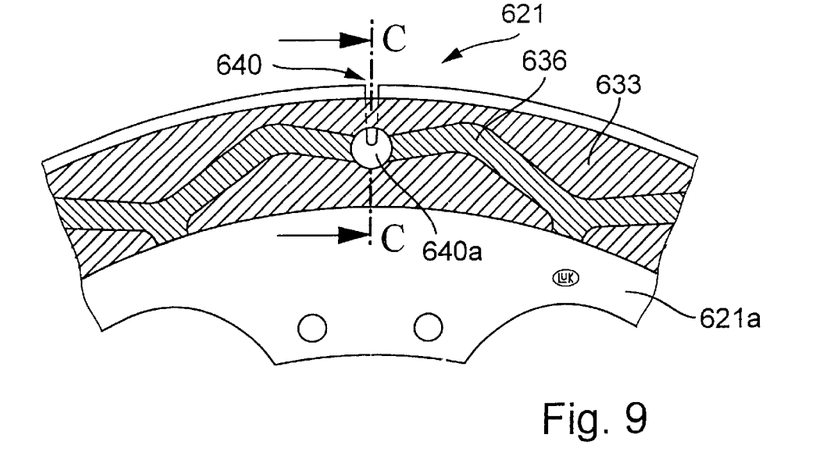
FIG. 9 is a fragmentary elevational view of a further friction disc which can be utilized in the combined bypass clutch and path establishing means of the improved fluid-operated torque converter.
Figure 10:
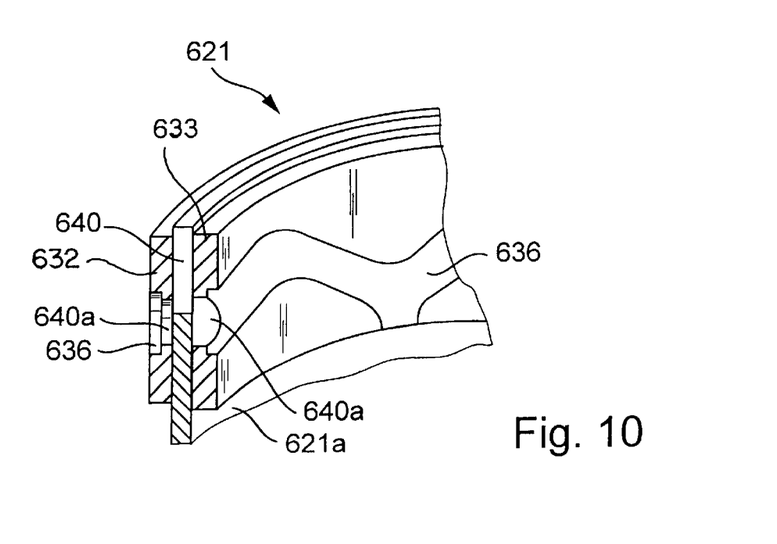
FIG. 10 is a fragmentary partly axial sectional and partly perspective view substantially as seen in the direction of arrows from the line C—C of FIG. 9.

FIGS. 9 and 10 illustrate certain features of a further embodiment of the improved fluid-operated torque converter having a friction disc or carrier 621 with a ring-shaped (washer-like) component 621a bearing two washer-like friction linings 632, 633. These friction linings have exposed surfaces provided with zig-zag shaped channels or grooves 636. The component 621a has at least substantially axially extending slots 640 (only one shown) which communicate with the grooves 636 and can supply converter fluid thereto. The slots 640 are spaced apart from each other as seen in the circumferential direction of the component 621a, and the configuration of each of the grooves 636 can match or approximate that of the zig-zag shaped groove 136 shown in FIG. 2.

Excessive tolerances of the parts 621a, 622, 623 can be avoided and the assembly of the structure shown in FIGS. 9–10 (as well as of the torque converter employing such structure) can be simplified by providing the friction lining 633 with slots 640 including enlarged axially inner end portions 640a having widths (as seen circumferentially of the friction disc or carrier 621) which exceed the widths of adjacent portions of the respective slots. This ensures that the dimensions of the slots 640 determine the rate of fluid flow between one of the plenum chambers (not identified in FIGS. 9 and 10) and the grooves 636.

In the embodiment of FIGS. 9 and 10, each opening 640 can supply fluid simultaneously to both grooves 636. It is clear that only one groove 636 can receive fluid at any selected time; the delivery of fluid to the two grooves can take place alternatingly or in accordance with a preseleted pattern. Furthermore, one of the grooves 636 can receive fluid from a first number (including one) of slots 640, and the other groove can receive fluid from a different second number of such slots. Still further, certain slots 640 can communicate with both grooves 636, and each of the remaining slots can communicate only with one of the two grooves. For example, a first number (N1) of slots can communicate with both grooves 636, a second number (N2) of slots can communicate only with the groove 636 of the friction lining 632, and a third number (N3) of slots can communicate only with the groove 636 of the friction lining 633.

In all other respects, the fluid-operated torque converter embodying the friction disc or carrier 621 can be constructed and can operate in the same way as the torque converter 1 of FIG. 1 or any other torque converter which employs friction disc with two friction linings.

The manner in which the two plenum chambers can receive and discharge converter fluid is disclosed, for example, in commonly owned copending U.S. patent application Ser. No. 10/146,708 filed May 14, 2002 by Thorsten Krause and Bruno Muller for "HYDRODYNAMIC TORQUE CONVERTER".

The improved path establishing unit which is utilized in the torque converter of the present invention can employ a single pair or two or more pairs of cooperating friction surfaces. For example, the bypass clutch can utilize an axially movable piston (24) which is provided with a friction surface (26) and is adapted to be non-rotatably connected with the output element of the torque converter. The friction surface of the piston is in frictional engagement with a friction surface rotating with the housing of the torque converter, e.g., with a friction surface of the housing (see the friction surface of the wall 3a' of the housing 3 shown in FIG. 1). A friction lining can be mounted on the piston and/or on the housing, and (under certain circumstances) such friction lining is provided with a pattern of grooves or with single-groove having a suitable design. At least one friction surface can have a conical (such as frustoconical) outline.

If the bypass clutch must transmit pronounced torques, such clutch preferably employs a friction disc (for example, the disc or carrier 21, 121 or 221) each side of which carries a friction lining. One friction lining (e.g., the lining 22) has a friction surface which can engage a friction surface (25) on the housing (3); the friction surface on the housing can be provided on a part (3a') which is of one piece with the housing (as actually shown in FIG. 1) or which is a disc or an analogous separately produced part non-rotatably affixed to the housing. The other friction lining (23) is borne by the axially movable piston (24) which is compelled to share the angular movements of the housing, e.g., by being connected to the housing by leaf springs (27) which are preferably located radially outwardly of the friction linings and are riveted to the housing. The friction linings can constitute prefabricated (profiled) parts which are borne by the housing (3), by the friction disc or carrier 21 and/or by the piston 24. The number of friction linings can exceed two; for example, the torque converter of FIG. 1 can employ three or four friction linings such as the friction lining 22 and 23 on the carrier 21, a further friction lining on the wall 3a', and still another friction lining on the piston 24. Such package of three or four friction linings is subjected to axial pressure by the piston 24 when the thus modified bypass clutch 20 is at least partially engaged.

The configurations of the grooves 136, 137 in the friction linings 122, 123 of FIGS. 2 and 3 and the distributions of throttling orifices 140, 140a are preferred in many torque converters embodying the present invention because such arrangement has been found to contribute to highly predictable uniform or practically uniform cooling of each portion of each of the two friction linings. Another presently preferred embodiment of the novel path establishing unit employs at least one first throttling orifice which communicates directly with a groove of a first friction lining; at least one second throttling orifice is located downstream of the at least one first throttling orifice (as seen in the direction of fluid flow from the chamber to the chamber 32) and discharges into a groove of a second friction lining. Thus, the fluid first flows through the groove of the first friction lining and the reupon through the groove of the second friction lining. The periods of dwell of converter fluid in the two grooves (i.e., in the two friction linings) can be selected as well as the rates and other characteristics of fluid flow in the two grooves can be varied within a wide range by appropriate selection of the dimensions and/or numbers of the first and second throttling orifices. Here, again it is advisable to cause the fluid inlets to the first and second throttling orifices to alternate, as seen in the circumferential direction of the friction linings; this also contributes to more predictable, more reproducible and uniform cooling of the friction linings and other parts which are heated as a result of frictional engagement of various constituents during engagement and disengagement of the bypass clutch as well as during intentional operation of the bypass clutch with slip between the housing and the input element (such as the shaft 8) of the driven unit.

Without further analysis the foregoing will so fully reveal the gist of the present invention that others can, by apply current knowledge, readily adapt it for various applications without omitting features that, from the standpoint of prior art, fairly constitute essential characteristics of the generic and specific aspects of the above outlined contribution to the art of hydraulic torque converters and, therefore, such adaptations should and are intended to be comprehended within the meaning and range of equivalence of the appended claims.

What is claimed is:

1. A fluid-operated apparatus for transmitting torque from a rotary output element of a prime mover to a coaxial input element of a driven unit, comprising: a hollow rotary fluid containing housing coaxial with and connected to the output element; a pump connected with and located in said housing; a turbine rotatable with the input element and being located in and rotatable relative to said housing; a bypass clutch disposed in said housing and being engageable to connect said housing with said input element, said clutch including a piston movable axially in and dividing the interior of said housing into a plurality of chambers in the engaged condition of said clutch, a first chamber of said plurality having an inlet and a second chamber of said plurality having an outlet, said piston being movable axially of said housing to engage the clutch in response to an increase of fluid pressure in said first chamber above the fluid pressure in said second chamber; and means for establishing a path for the flow of fluid between said first and second chambers in the engaged condition of said clutch, including a first friction surface borne by said housing, a second friction surface adjacent said first friction surface at least in the engaged condition of said clutch and rotatable with said input element, at least one of said surfaces having a groove communicating with said first and second chambers, defining a first portion of said path and being arranged to offer a pronounced resistance to the flow of fluid therethrough, and at least one throttling orifice defining a second portion of said path, wherein the fluid flows radially inwards from a boundary line between an outside diameter of at least one of the first and second friction surfaces and a neighboring surface and as the fluid flows radially inside from the outside diameter, the flow of the fluid is redirected at least once in the axial direction.

2. The apparatus of claim 1, wherein said at least one orifice is arranged to offer to the flow of fluid therethrough a resistance exceeding said pronounced resistance of said groove.

3. The apparatus of claim 2, wherein said pronounced resistance of said groove is between at least 2 and 10 percent of the combined resistance of said at least one groove and said at least one orifice.

4. The apparatus of claim 1, wherein said at least one orifice is provided in a metallic part of said bypass clutch.

5. The apparatus of claim 4, wherein said metallic part is one of a portion of said housing, a friction disc of said bypass clutch and a portion of said piston.

6. The apparatus of claim 1, wherein said bypass clutch further includes a carrier and at least one friction lining on said carrier, said at least one friction surface being provided on said friction lining.

7. The apparatus of claim 6, wherein said carrier is one of a friction disc of said bypass clutch, a portion of said housing and a portion of said piston.

8. The apparatus of claim 6, wherein said at least one orifice is provided in said carrier.

9. The apparatus of claim 6, wherein said groove is a circumferentially complete groove and said at least one friction surface has at least one opening connecting said groove with one of said chambers and offering a negligible resistance to the flow of fluid therethrough.

10. The apparatus of claim 1, further comprising at least one torsional vibration damper interposed in a power train between said housing and the input element of the driven unit.

11. The apparatus of claim 1, further comprising a stator provided in said housing between said pump and said turbine.

12. The apparatus of claim 1, wherein said groove includes at least one section extending at least substantially circumferentially of said piston and having a first portion communicating with said at least one throttling orifice and at least one second portion, said path establishing means further having at least one opening communicating with said at least one second portion of said at least one section and with one of said chambers and offering a negligible resistance to the flow of fluid therethrough.

13. The apparatus of claim 1, wherein said at least one friction surface is an annular surface having an axis coinciding with the axis of said housing and including a portion remotest from said axis, said at least one throttling orifice being provided at said portion of said annular surface.

14. The apparatus of claim 1, wherein said at least one friction surface has an intake for fluid adjacent said at least one throttling orifice.

15. The apparatus of claim 14, wherein said intake in said at least one friction surface is a stamped out portion of said path establishing means.

16. The apparatus of claim 14, wherein said path establishing means includes a friction lining and said at least one friction surface is provided on said friction lining, said intake of said at least one friction surface being constituted by a stamped-out portion of said friction lining.

17. The apparatus of claim 16, wherein said at least one throttling orifice is provided in said friction lining and said friction lining is further provided with a stamped-out passage communicating with said at least one throttling orifice and offering to the fluid flow a resistance constituting a small fraction of the resistance offered by said throttling orifice.

18. The apparatus of claim 1, wherein said path establishing means comprises an annular component and at least one friction lining borne by said component and provided with said at least one friction surface, said at least one orifice being provided at least in part in said annular component and said annular component further having at least one first positioning means in register with second positioning means of said at least one friction lining.

19. The apparatus of claim 18, wherein at least one of said positioning means includes a notch in the respective one of said component and said friction lining.

20. The apparatus of claim 1, wherein said path establishing means comprises an annular metallic component and at least one friction lining borne by said component and provided with said at least one friction surface, said groove including a first channel provided in the said at least one friction surface and a second channel communicating with said first channel by way of said at least one throttling orifice at least in the engaged condition of said bypass clutch.

21. The apparatus of claim 20, wherein at least said first channel is a circumferentially complete substantially annular channel.

22. The apparatus of claim 20, wherein at least said first channel includes a plurality of discrete sections.

23. The apparatus of claim 1, wherein said at least one surface is an annular surface and said path establishing means has a plurality of throttling orifices spaced apart from each other in a circumferential direction of said annular surface.

24. The apparatus of claim 1, wherein said path establishing means has a plurality of throttling orifices disposed at different distances from the axis of said housing.

25. The apparatus of claim 1, wherein said path establishing means further comprises an annular carrier provided between a wall of said housing and said piston and first and second friction linings provided on said carrier and respectively confronting said wall and said piston, said at least one friction surface including first and second portions respectively provided on said first and second friction linings and the other of said surfaces having a first portion provided on said wall and confronting said first friction lining and a second portion provided on said piston and confronting said second friction lining.

26. The apparatus of claim 25, wherein said groove includes first and second portions respectively provided in said first and second portions of said at least one friction surface and said at least one orifice communicates with said first and second portions of said groove.

27. The apparatus of claim 26, wherein said path establishing means has a plurality of first throttling orifices communicating with said first portion of said groove and a plurality of second throttling orifices communicating with said second portion of said groove, said first orifices alternating with said second orifices as seen in a circumferential direction of said carrier.

28. The apparatus of claim 27, wherein a third portion of said path extends between said first and second throttling orifices.

29. The apparatus of claim 28, wherein said third portion of said path is defined by at least one portion of said groove.

30. The apparatus of claim 1, wherein said path establishing means includes an annular friction lining borne by said piston and engaging a wall of said housing in the engaged condition of said bypass clutch, said groove and said at least one throttling orifice being provided in said friction lining and said path establishing means further having at least one opening connecting said at least one throttling orifice with one of said chambers.

31. The apparatus of claim 30, wherein said friction lining has a radially outermost and a radially innermost surface, said at least one opening being provided in one of said innermost and outermost surfaces of said friction lining.

32. The apparatus of claim 30, wherein said at least one opening is provided in at least one of said friction lining and said piston.

33. The apparatus of claim 30, wherein said at least one opening and said at least one throttling orifice offer a major first resistance and said groove offers a minor second resistance to the flow of fluid between said chambers.

34. The apparatus of claim 1, wherein said path establishing means is integrated into said bypass clutch.

35. The apparatus of claim 1, wherein said path establishing means includes at least one friction lining disposed intermediate said piston and a wall of said housing, said piston being disposed between said wall and said turbine.

36. The apparatus of claim 1, wherein said driven unit includes an automatic change-speed transmission.

37. The apparatus of claim 1, further comprising leaf springs axially movably connecting said piston to said housing.

38. A hydrodynamic torque converter for use between a rotary output element of a prime mover and a rotary input element which is coaxial with the output element and forms part of a change-speed transmission, particularly in the power train of a motor vehicle, comprising: a rotary fluid-containing housing coaxial with and connectable to the output element; a pump disposed in and rotatable with said housing; a turbine disposed in and rotatable by fluid in said housing in response to rotation of said pump; an engageable and disengageable bypass clutch disposed in said housing and operable to at least temporarily connect the housing with the input element, said clutch including a piston movable axially of said housing and dividing the interior of the housing into at least two fluid-containing chambers in the at least partly engaged condition of the clutch, a first chamber of said chambers having a fluid-admitting inlet and a second chamber of said chambers having a fluid-discharging outlet, said clutch being engageable in response to admission of fluid into said first chamber at a pressure exceeding the fluid pressure in said second chamber with attendant axial movement of said piston in said housing, said clutch further having a first friction surface rotatable with said housing and a second friction surface rotatable with the input element and bearing upon the first surface in at least partly engaged condition of the clutch; a torsional vibration damper disposed in said housing and including an input member rotatable with and about the axis of said housing at least in the engaged condition of said clutch, an output member turnable about said axis relative to the input member, and means for yieldably opposing rotation of said output member relative to said input member; and means for non-rotatably mounting said output member on the input element of the transmission, including a first hub rotatable with said turbine, a second hub adjacent and coaxial with said first hub and axially movably carried by the input element, a set of mating gears coupling said second hub for rotation with said output member, and energy storing means for yielding biasing said hubs against each other axially of said housing.

39. The torque converter of claim 38, wherein said damper further comprises a second set of mating gears coupling said input member for rotation with said first hub.

40. The torque converter of claim 39, wherein at least one of said sets includes gears having limited freedom of angular movement relative to each other.

* * * * *